Aug. 21, 1962

H. U. GARRETT ETAL 3,050,121

WELL APPARATUS AND METHOD

Filed April 22, 1957

HENRY U. GARRETT
CLIFFORD M. PETERS
INVENTORS

BY Browning, Simms & Hyer

ATTORNEY

FIG. 2C

HENRY U. GARRETT
CLIFFORD M. PETERS
INVENTORS

HENRY U. GARRETT
CLIFFORD M. PETERS
INVENTORS

BY Browning, Simms & Hyer

ATTORNEY

United States Patent Office 3,050,121
Patented Aug. 21, 1962

3,050,121
WELL APPARATUS AND METHOD
Henry U. Garrett and Clifford M. Peters, Longview, Tex., assignors to U. S. Industries, Inc., New York, N.Y.
Filed Apr. 22, 1957, Ser. No. 654,423
21 Claims. (Cl. 166—46)

This invention relates to a well completion, work-over or producing apparatus and method of the permanent completion type and particularly to one which does not require an effective casing in the well. In one of its aspects, it relates to an apparatus and method for completing and producing a well wherein all the well operations are carried out through a plurality of well tubings or conduits which are cemented in the bore hole so that the well need not be cased or can be only partially cased. In another of its aspects, it relates to an apparatus and method for completing and producing a well having multiple producing formations. In still another of its aspects, it relates to an apparatus and method for effecting downhole separation of gas and oil.

As is well known, it has been conventional in the past to install and cement casing in a well before it is produced. The reasons for doing this are numerous and suffice it to point out that such installation is expensive and the casing is subject to failure for various reasons. Further, with the advent of slim-hole drilling, the use of casing has become particularly troublesome not only because it is difficult to install and cement in a slim-hole, but also because it limits the reduction in size of the hole. Thus, the hole must be large enough to permit the casing to be inserted and cemented in place, the casing in turn being large enough to accommodate the production tubing. Further, particularly in high pressure wells, it has been deemed necessary to fill the tubing-casing annulus with mud or other liquid to control the well. This not only usually requires the well to be cased, but also complicates the completion and production. It would therefore be desirable to possess an apparatus and method by which a well could be completed and produced without installing casing or without depending upon the casing remaining in operable condition. Such a method would also find advantage in work-over of wells having defective casing because it would eliminate squeeze cementing or pulling and re-running new casing.

It is accordingly a general object of this invention to provide an apparatus and method for completing and producing or working over an uncased well or a partially cased well, or one in which the casing is defective, the apparatus and method affording not only the flexibility of operation of a conventional cased well completion system, but also certain advantages not possessed by such system, not the least of which is considerably greater economy of operation and installation.

Another object of the invention is to provide a well apparatus for producing, completing or working over a well wherein a string of at least two tubings are joined together with connecting flow passageways at at least one and preferably at a plurality of different depths and wherein at least one of the tubings either contains or is adapted to receive, such as by wireline manipulation, suitable equipment or tools for controlling flow through such passageways, the tubings being permanently cemented in the well.

Another object is to provide a well apparatus and method wherein a string of parallel tubings is permanently cemented in the well, the cement extending to an upper level above the uppermost producing formation, and to the surface of the earth if desired, to not only effectively isolate the formations from each other, but also to adequately support the tubing in the hole, prevent corrosion thereof, and to afford many other advantages, some of which will be pointed out hereinafter.

Another object is to provide a permanent completion method and apparatus which is much cheaper to install and use than is the conventional "permanent" completion system or other conventional commercially used completion systems.

Another object is to provide a method and apparatus for completing, producing and working over a well wherein two tubings, cemented in the borehole, are provided with valve-controlled intercommunicating passageways so that a variety of well operations can be performed.

Another object is to provide a permanent completion method and apparatus wherein a string of parallel tubings is cemented in a bore hole and thereafter, one tubing is perforated at appropriate producing formation levels, the arrangement being such that the lower formation can be perforated, tested and then the tubing plugged and an upper formation thereafter perforated and tested and so on consecutively through still other upper formations, if any, whereby it is not necessary to squeeze cement the perforations at one formation before another formation can be perforated and tested.

Another object is to provide a method and apparatus wherein a producing formation can be completed after a production tubing has been cemented in the bore hole, the completion being accomplished by forming a flow passage from the lower end of the production tubing through the cement laterally into the formation.

Another object is to provide a permanent completion method and apparatus wherein a plurality of tubings are cemented in the bore hole and yet two or more producing formations can be simultaneously and separately produced.

Another object is to provide an apparatus and method for producing a well wherein gas can be separated from the oil while the latter is still in the well and then the oil and gas separately removed from the well so that, in effect, there is provided a down-hole gas-oil separator and yet, if desired, the gas pressure can be used to flow the oil from the well.

Another object is to provide a well apparatus and method in which the pressure in a tubing is first decreased to cause oil flow into the tubing and after such flow has occurred to the desired extent, the pressure in the tubing is increased to pressure the oil from the well via another tubing.

Other objects, features and advantages of this invention will be apparent to one skilled in the art upon the consideration of the written specification, the appended claims and the attached drawings wherein:

Like characters of reference will be used throughout the several views to designate like parts. The terms "tubing" and "tubings" are used in this specification to indicate conduits inserted into a well and serving to convey fluids to or from the surface of the earth. The term is intended to exclude a casing commonly used for lining a well.

In accordance with one aspect of this invention, a string of at least two parallel tubings is run into the well to be completed and then the tubings are cemented in place by filling the bore hole of the well with cement exteriorly of the tubings to a level at least above the uppermost producing formation or to a level up above the lower end of any surface or intermediate casing which has been set. The tubings are provided with at least one and preferably a plurality of passageways interconnecting the same and with valves controlling flow through these passageways responsive to manipulation at the earth's surface. This permits a variety of well operations to be conducted as will be explained in greater detail below. After the cement has set, the production tubing can be perforated, the perforation extending through the cement around the tubing into a producing formation. Production then takes place via the perforation and the tubing, the cement acting to prevent any flow exteriorly of the tubing except through the perforation and bridging across the formations to seal the same in. The cement also acts to provide adequate support for the string, isolate the exterior thereof from formation fluid so as to prevent corrosion, and in addition performs certain other functions. The arrangement is such that after the tubing has been set and cemented, the rig can be moved from location and the balance of the completing or working over operations performed by wireline or the like. These other operations can include perforating, acidizing, fracturing, chemical injection, gas lift, etc. Further, the arrangement is such that a plurality of formations can be simultaneously and separately produced by landing suitable flow control devices in the tubings adjacent the formations. Further, since the cement effectively seals in the formations except for their communication with the tubing, the well head need be nothing more than a simple closure together with master valves on the tubing and there is no need for mud in the well to control pressure. Other advantages and features will either be made apparent as the description proceeds or will be readily apparent to those skilled in the art.

Before proceeding further, it may be well to point out that when reference is made to an uncased bore hole, such includes not only a bore hole without any casing whatsoever (except perhaps for the usual surface casing) but also one which is cased and the casing is not used for any of the completing or producing operations in the vicinity of the producing formations and only a part of the casing is used such as an upper part above the producing formations. The string of tubings can be run into a cased bore hole, as in one where the casing is defective, to achieve all of the operational advantages possible in uncased borehole. In such instance, the casing in the bore hole below the upper producing formations serves no function insofar as the apparatus and method of this invention is concerned.

Figure 1A:
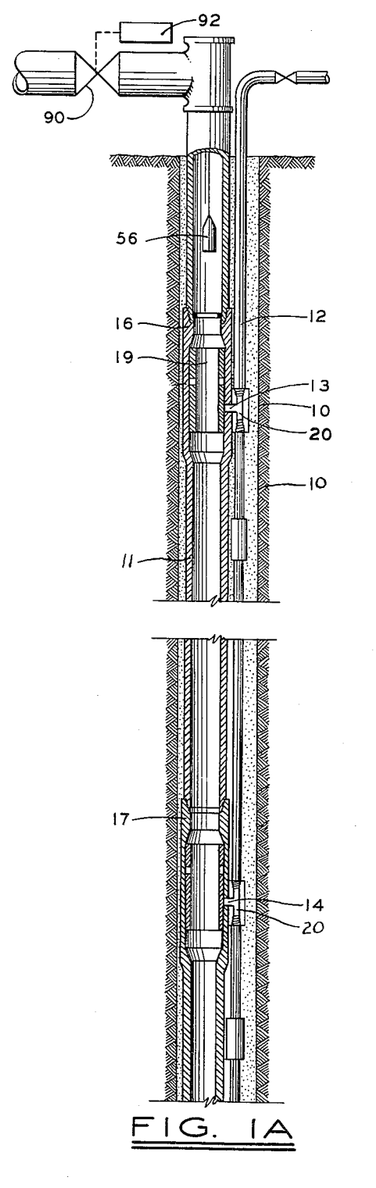
FIGS. 1A and 1B illustrate, somewhat schematically, one embodiment of the well apparatus of this invention by which the method hereof can be practiced.
Figure 1B:
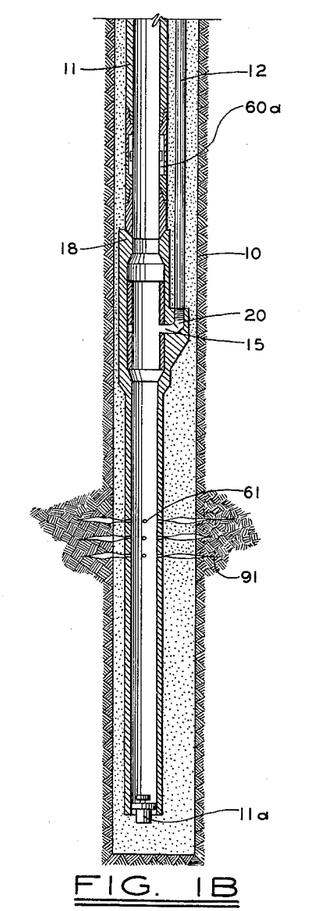

Referring now to the drawings, FIGS. 1A and 1B illustrate a bore hole 10 in which is disposed a string of at least two tubings or conduits, such as tubings or conduits 11 and 12, in parallel side-by-side relationship. Tubing 11 is of conventional size such as 2⅜ in. to 2⅞ in. tubing, and is large enough to receive wireline equipment so as to permit various manipulations of wireline tools therein. Preferably, particularly for shallow hole work, tubing 12 is a so-called "macaroni tubing" and is of considerably lesser diameter than tubing 11 and may be from ¾ to 1½ in. tubing. By using this different size tubing, numerous advantages are obtained, not the least of which is that the apparatus is particularly adapted for slim hole completions and the cost of the smaller macaroni tubing is materially less than that of a conventional oil well tubing.

The oil string 11 extends at least into the lowermost formation to be produced and preferably somewhat beyond such formation so as to provide adequate room for manipulation of wireline tools, such as perforating guns. It is usually preferred that the other strings of tubing, such as macaroni tubing 12, terminate at a point above the uppermost producing formation. By terminating it thusly, the oil string can be perforated by conventional methods without the danger of also perforating the macaroni tubing. However, it is possible to orient the perforating gun so that it fires outwardly of the oil string in a direction such as to miss the macaroni string and in such case the macaroni string can extend to any desired depth.

The tubings are interconnected by a plurality of vertically spaced passageways or ports 13, 14 and 15, affording fluid communication between the tubings. As illustrated, these passageways are disposed in mandrels 16, 17 and 18 which are common to the two strings of tubing. Further, mandrel 16 has a passage 19 therethrough in communication with tubing 11 above and below so that flow through the tubing passes upwardly or downwardly through passage 19. Similarly, a passage 20 is provided to afford communication between the portions of macaroni tubing 12 above and below mandrel 16. The other mandrels, such as mandrels 17 and 18, can be similarly constructed except that mandrel 18 has its passage 20 terminating at passageway 15.

As many of the mandrels can be used as is desired and to provide the necessary vertically spaced levels of intercommunication between the two tubing strings. For example, the mandrels can be adapted to receive wireline gas lift valves for controlling flow of lifting gas from one tubing to another. In such instance, the mandrels will be spaced according to well-known gas lift spacing principles based upon the conditions expected at the time the well is completed. Additional or the same mandrels can be used for other well operations such as formation back-pressure control, chemical injection, reverse circulation, etc.

*Cementing Procedure*

In accordance with the method and apparatus of this invention, the string of tubings is cemented in the bore hole of the well, the cement filling the bore hole exteriorly of the tubings to an upper level above the uppermost producing formation. This can be accomplished by running the string into the bore hole with a guide shoe or a perforated bull plug 11b on the bottom of the string and with passageways 13, 14 and 15 closed by suitable valves such as those hereinafter described. The oil string should have centralizers 11c thereon at proper spacing. One of the advantages of this method of completion is that from the top producing formation on down, centralizers are highly effective because of the limberness of the oil string. This makes for a better cement job and will usually eliminate many squeeze jobs. Scratchers can also be used if desired.

After the strings are positioned in the hole as above-described, the cement can be pumped down the oil string preferably followed by a cementing plug. The plug can be followed with oil or water and the cement forced out the shoe or bull plug 11b and thence upwardly to fill the bore hole exteriorly of the string. The cement plug can be of the type which latches in position at the bottom of the oil string when it reaches the same or it can be a simple plug. In the latter case, adequate pressure should be kept on the oil string to prevent cement and the cement plug from backing up therein. As stated above, the cement should rise at least to a level above the uppermost producing formation and it is usually preferable that it rise into the surface or intermediate casing, if any, and in shallow holes, the cement can be brought to the earth's surface of the well. For deeper holes, this may not be economical. By "producing formations," it is meant to include any formation which it is desired to seal off with cement whether or not such formation has any oil or gas, e.g. it may be water bearing.

After cementing, the well-head can be completed and a tree installed. As illustrated in FIG. 1A, it is not essential that a well-head be installed at all, particularly where the cement is brought to the surface of the earth. However, where one is desired, it can be very simple such as a plate 10a (FIG. 4A) connected to surface casing 10b and welded or otherwise sealed to the tubings. For shallow and low pressure production, the tree can comprise simply a master valve for each of the oil string and the macaroni string and these should be full bore valves. A suitable lubricator 11d for wireline operations can be mounted atop the oil string above the master valve.

*Perforation Procedure*

Since the cement will usually be displaced with oil, the well is ready to perforate once the cement has set. A conventional tubing perforating gun 56a (FIG. 4B) or the like can be used. By lowering the gun into the oil string via a wireline, perforations 61 can be made through the oil string and the cement surrounding the same into a producing formation. The hydrostatic head of the oil column already in the oil string will usually be sufficient to hold the formation pressure after shooting. However, if high pressures are encountered, the lubricator stuffing box allows a higher back-pressure to be maintained on the tubing during shooting.

*Flow Control Apparatus*

Figure 3A:
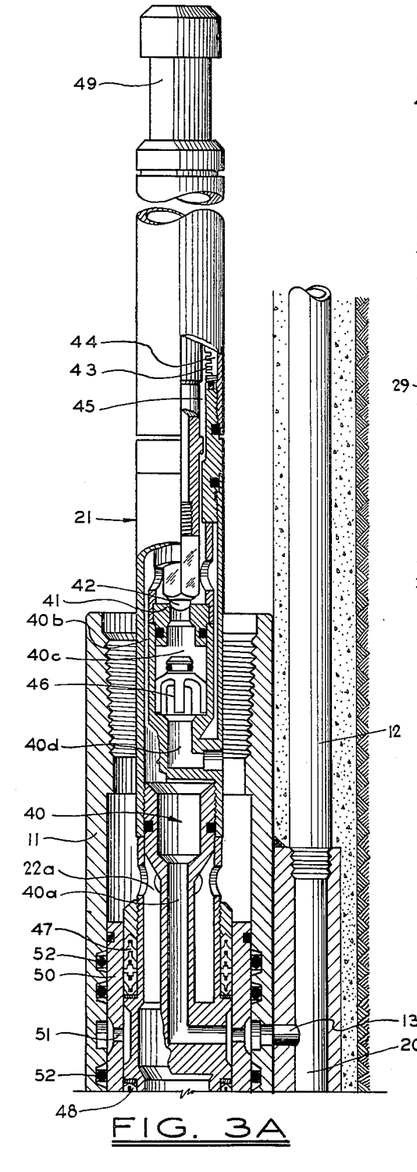
FIGS. 3A and 3B are enlarged views similar to enlarged views FIGS. 2A, 2B and 2C except showing one form of gas lift valve landed in a mandrel.
Figure 3B:
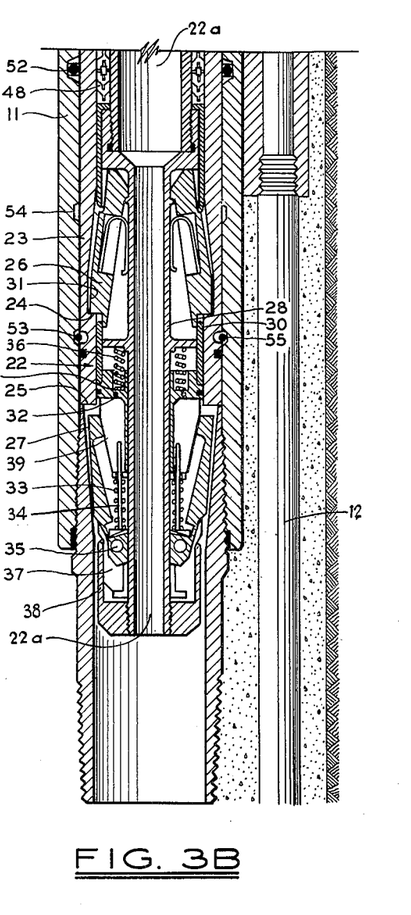

Means are provided for controlling flow through the passageways 13, 14 and 15 and preferably such means are controllable by a manipulation at the earth's surface such as via a wireline. It is preferred that as a part of such means, a receiving means be provided adjacent each of the passageways for receiving a wireline tool which can control flow through the passageways. Thus, as shown in FIGS. 3A and 3B the flow control means can comprise a gas lift valve 21 adapted to be landed in a receiving means 22 so as to control the flow through passageway 13.

In this particular arrangement, the receiving means is illustrated as comprising a sleeve 23 having oppositely facing shoulders 24 and 25 adapted to cooperate with pivoted latching dogs 26 and 27 on a latch assembly connected to the gas lift valve or other tool. The latch assembly includes two relatively slideable parts 28 and 29. Part 29 includes an upstanding skirt 30, which is adapted to hold dogs 26, which are urged to latching position by springs as shown, retracted when the skirt is in its uppermost position. Thus, by pivoting dogs 26 inwardly from their FIG. 3B position and pushing part 29 upwardly, the upper end of the skirt will contact surfaces 31 of the dogs and hold them retracted. Part 29 can be maintained in its upper position by shear pins 32. The tool then can be run into the hole without the dogs catching on the tubing.

Dogs 27 are likewise outwardly biased, as by springs 33, which act downwardly on elements 34 to bias the dogs outwardly. It will be noted the point of contact between elements 34 and dogs 27 is outwardly offset with respect of shear pins 35 which pivotally support dogs 27.

With the foregoing arrangement, the tool can be run into the hole with the dogs 27 riding, if desired, on the walls of the tubing. When dogs 27 have been positioned below a desired shoulder, such as 25, an upward strain on the tool will shear pin 32 whereby springs 36 move part 29 downwardly to release dogs 26. This locks the latching assembly in the receiving means. When it is desired to remove the latching assembly, an upward pull on the assembly will shear pins 35, which permit springs 33 to move dogs 27 downwardly into recesses 37. These recesses have upstanding skirt portions 38 which cause retraction of the dogs when they move down.

It will be noted that with the latching mechanism in its FIG. 3B position, a cam surface 39 on movable part 29 has moved down to positively lock dogs 27 in their outward position.

While the above described receiving means and latching mechanism is now preferred, it will be obvious that other arrangements can be provided to latch a wireline tool in this or in another mandrel of other design.

Referring now to the gas lift valve of FIGS. 3A and 3B, it can comprise a housing having a passageway 40 communicating between passageway 13 and the interior of tubing string 11. Passageway 40 is comprised of portions 40a, 40b, 40c and 40d. Disposed in this passageway is a valve seat 41 and a valve element 42, the latter being moved between opened and closed positions by pressure responsive means, e.g. a bellows 43 enclosing a charge chamber 44. The other side of the bellows can be exposed to pressure in tubing 12 via passage 45. With this arrangement, it will be seen that when the pressure in passage 45 sufficiently exceeds the pressure in charge chamber 44, valve element 42 will move to open position. When the pressure falls, the valve element will move to closed position.

If desired, a check valve 46 can be employed to prevent reverse flow.

As part of the valve latching means or as part of the valve or mandrel, means are provided constraining flow from the passageway 13 to be through the valve. Such means can take the form of seals 47 and 48 along with the body portions containing passageway 40a. Thus, it can be seen that flow to or from passageway 13 must be through passageway 40a and cannot be directly with the interior of tubing 11.

Also, a bypass passage is provided to permit fluids to flow upwardly or downwardly past the latch assembly and the valve. In this instance, the by-pass is internally of the assembly and is shown at 22a. This permits a relatively small diameter assembly particularly useful with slim hole tubing. If desired, the mandrel, latch assembly and valve arrangement of copending application Serial No. 414,924, filed March 9, 1954, can be used. Of course, such arrangement will be modified so that the only port leading laterally to the exterior of the mandrel will be in communication with the other string of tubing in the same manner as shown in the FIGS. 3A and 3B. Also, the so-called side pocket mandrel arrangement shown in the 20th edition of Composite Catalog of Oil Field and Pipeline Equipment at page 995 can also be substituted for the illustrated mandrels simply by adding the mandrel body portion for receiving the other (e.g. macaroni) string of tubing similar to the arrangements of FIGS. 3A and 3B. It will also be appreciated that mandrels of other designs can be used.

The wireline flow control tool thus described has a part releasably engageable by a wireline landing or pulling tool so that the flow control tool can be landed and removed from its receiver. Such part can take the form of an ordinary wireline head 49.

In addition to the receiving means, it is usually preferred that the mandrel include as a part thereof, a valve means for closing port 13 whenever a wireline tool is not landed in the mandrel, but to be automatically opened when the tool is landed. In a preferred form, such means takes the form of a sleeve 50 connected to the receiving means and provided with a plurality of ports 51 which in their FIG. 3A position interconnect and form a part of passageways 13 and 40. If desired the receiving means and valve means 50 can be made separate. Suitable seals 52 are provided above and below ports 51 to prevent bypassing of fluid between the sleeve and mandrel body. Also, detent means, here shown in the form of a snap ring 53, can be provided to releasably maintain sleeve 50 in its port-opening and in its port-closing position. The snap ring cooperates with grooves 54 and 55 in the respective positions of the sleeve.

In addition to the sleeve type construction described above, there can be used the side pocket mandrel which has a receiving means and in its present construction, uses a blanking valve to close off its port to its exterior, i.e. herein to the macaroni string. Thus, it is not necessary that the mandrel include a sleeve or other similar valve as a permanent part thereof, but instead other arrangements such as the blanking valves mentioned above, can be used. The important consideration is that flow through passageways 13, 14 and 15 is controllable so that these passageways can be opened and closed by manipulation occurring at the earth's surface, such as by wireline.

Thus, in operation, the gas lift valve and latch mechanism are lowered into the bore hole, as by a suitable landing tool 56 (FIG. 1A) with dogs 26 retracted. The valve and mechanism are free to pass through any desired number of mandrels. When a desired mandrel is reached, dogs 27 are positioned under a shoulder 25 and an upward pull on a tool releases dogs 26. Then by jarring down on the tool, sleeve 50 is moved to its port-opening position and the wireline tool can be disengaged from the valve and withdrawn from the hole. As so landed, the gas lift valve controls flow of gas from the macaroni tubing into oil string 11 responsive to changes in pressure in the macaroni tubing. When it is desired to remove the gas lift valve-latching assembly, it is engaged by a wireline pulling tool and an upward pull causes dogs 27 to retract and the tool can be removed from the hole. In this connection, shear pins 32 are made weaker than shear pins 35 so that they will shear before pins 35. Also pins 35 are made strong enough that they will not shear before sufficient force is exerted on the sleeve 50 to move it to its up position.

In accordance with the above disclosure, reference herein to "valve means" controlling flow through these ports will be understood to include not only a gas lift valve but also the sleeve valve of FIGS. 3A and 3B and the blanking valves on the side pocket mandrel as well as other alternatives which perform the same function. Thus, the above mentioned types of valves are merely exemplary.

With the foregoing arrangement, it can be seen that very close control of gas injection is accomplished. The volume of gas in the macaroni tubing is very small compared to the volume of an ordinary casing-tubing annulus. As a result, only very small volumes of gas are required to cause a predetermined change in pressure in the macaroni tubing. Accordingly, the quantity of gas injected under the control of the pressure responsive valves can be very closely controlled.

When it is desired to produce through the macaroni tubing, tubing 11 can be used as the lifting gas passage. Thus, by a simple rearrangement of the ports in the gas lift valve, it can be made responsive to such gas pressure to inject gas into the macaroni tubing. Also, the valve can be fluid operated by the head of liquid in either tubing by suitable rearrangement of ports in a manner known to those skilled in the art.

For gas lift and other purposes, as many of mandrels 16 and 17 can be made up in the tubings as is desired. Only two have been illustrated and it will be understood that all mandrels can be identical in construction to those shown in FIGS. 3A and 3B, no matter how many are used. Further, when more than two tubings are used, mandrels can be used to interconnect various pairs of the tubings in any desired manner and at any desired depth.

When oil is being lifted through tubing 11, the gas lift valve can be landed, if desired, in the lowermost mandrel 18. However, when oil is being lifted through the macaroni string, mandrel 18 has its sleeve shifted to open position and a suitable plug can be landed by wireline in landing nipple 60a. Then oil can flow up from perforations 61 through passageways 15 and 20 into the macaroni string. Gas lift valves can then be landed in the upper mandrels to inject gas from the oil string into the macaroni tubing.

*Production Method Using Stabilizer*

Figure 2A:
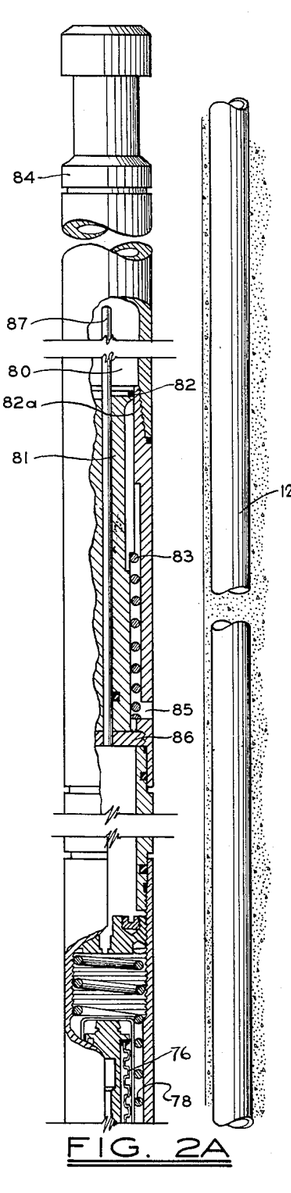
FIGS. 2A, 2B and 2C are an enlarged view of a portion of the well apparatus showing a stabilizer landed in one of the mandrels of FIGS. 1A and 1B.
Figure 2B:
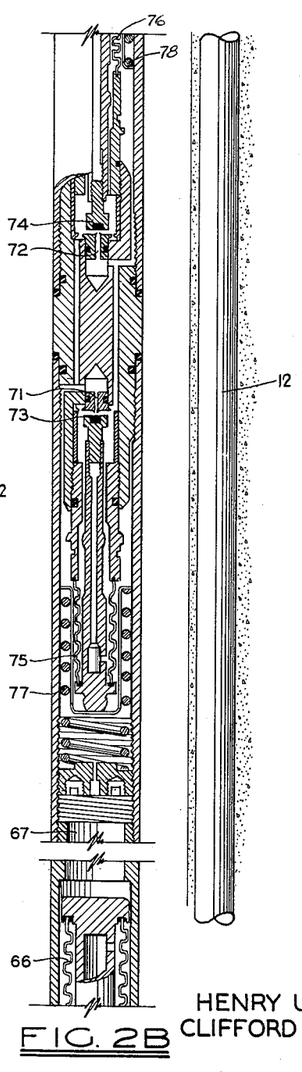
Figure 2C:
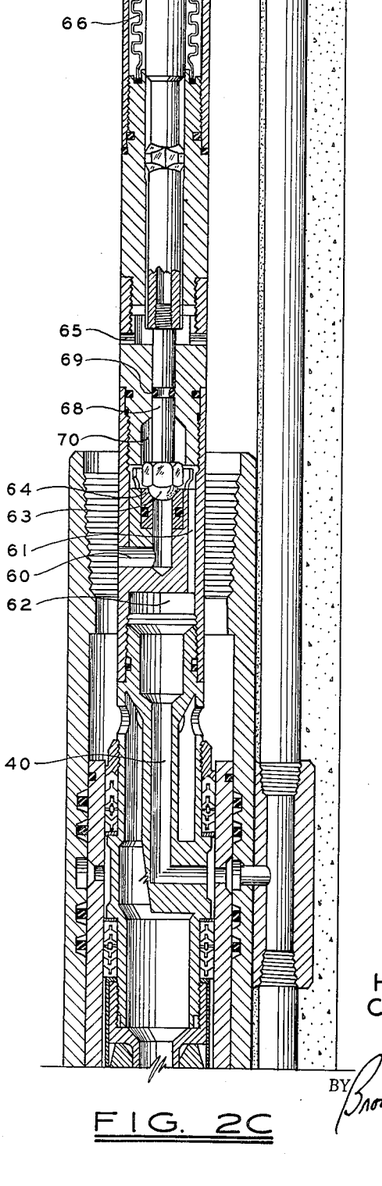

In accordance with another aspect of this invention, a stabilizer is landed in mandrel 18 or in another upper mandrel and its action is to permit an increase in the oil level in one of the tubings while the other tubing is shut off and then to open flow to the other tubing so that pressure in the first tubing can force oil out of the well. One form of such stabilizer is shown in FIGS. 2A, 2B and 2C. In this form the stabilizer has been connected to a latch assembly similar to that shown in FIGS. 3A and 3B and hence further description thereof will not be necessary.

Referring to the stabilizer itself, it has a flow passageway comprising portions 60, 61 and 62, the first being open to tubing 11 and the last communicating with passageway 40 at the upper end of the latching mechanism. Here again valve element 63 cooperates with seat 64 to control flow through the passageway. The valve element is moved to and from the seated position by pressure from tubing 11 acting through ports 65 on one side of a pressure responsive means 66. The other side of this pressure responsive means is exposed to a charge pressure in dome 67. Thus when the pressure in tubing 11 becomes high enough, the valve element 63 will be unseated and flow can take place from tubing 11 into the macaroni tubing.

In this connection it should be noted that the valving arrangement is of the balanced type, in that its opening and closing is not influenced by the pressure in the macaroni tubing. This is accomplished in this instance by restricting passageway portion 61 relative to passageway portions 60. This restriction is such that substantially all of the pressure drop is taken across passageway portion 61. Also stem 68 has a sliding seal 69 with the valve body and the effective cross-sectional area within this seal is preferably equal to the cross-sectional area of seat 64. Thus, with the valve seated, there is no effective area on which pressure from the macaroni tubing can act to urge the valve element toward either seated or unseated position. It is urged to open position only by the pressure acting in passageway portion 60 and by that within bellows 66. Upon the valve opening, the pressure in chamber above the seat increases from macaroni tubing pressure to the pressure of tubing 11, inasmuch as passageway 61 restricts flow to cause this. The pressure in chamber 70 is then effective across the cross-sectional area of seal 69 and since this area is equal to the area of the seat, there is no change in effective force urging the valve towards its open position when it is in either closed or open positions.

It is preferred that means be provided to change the pressure in the charge chamber responsive to a manipulation at the surface of the earth. In the illustrated stabilizer, this is accomplished by providing ports 71 and 72 which are respectively for bleeding pressure fluid from tubing 11 into and out of the charge chamber. Each of these ports is controlled by suitable valve elements 73 and 74, which are moved from seated to unseated position by differential pressures acting across pressure responsive members 75 and 76. The interior of the member 75 is exposed to the pressure of tubing 11 while its exterior is exposed to the pressure of the charge chamber 67. Thus when the tubing pressure increases sufficiently, valve element 73 will be moved off its seat to permit flow of fluid into the charge chamber to increase the pressure therein. On the other hand, member 76 has its interior exposed to the pressure of charge chamber 67 and its exterior to the tubing pressure. As a result, when the tubing pressure decreases sufficiently, the valve element will be unseated and pressure may bleed from charge chamber 67. The differential in pressure between the tubing and charge chamber which is required to cause one of the valve elements 73 or 74 to be unseated can be controlled and adjusted by resilient means 77 and 78. By suitable adjustment of these means, a working pressure range for tubing 11 can be provided within which neither valve element 73 nor 74 will be unseated. However, when the tubing pressure is changed to be without this range, one of the valve elements will be unseated depending upon whether the pressure is higher or lower than that in the charge chamber.

If desired, and it is usually preferred, a dome chamber 80 can be provided to afford a clean source of gas for passage in and out of charge chamber. As shown, the dome chamber extends above the dome pressure control assembly and means are provided for pre-charging it with a charge of clean gas before insertion into the well and then for opening the dome chamber for exposure to tubing pressure. Such means can include a piston 81 movable from its FIG. 2A position upwardly to free seal 82 from engagement with cylinder 82a. Spring means 83 is provided for biasing the piston toward open position. With the piston in its FIG. 2A position, the dome chamber can be charged through a suitable charging valve, as one in head 84, to any desired pressure less than the anticipated minimum bottom hole pressure. The pressure in the dome chamber then acts across piston 81 to hold it in its FIG. 2A position. As the tool is lowered downwardly, tubing pressure acts through ports 85 on the other side of piston 81 and when the force exerted by this pressure, plus that of spring 83, becomes high enough, it will overcome the counterforce of the precharge in the dome chamber and piston 81 will be moved upwardly. In its upper position, it has sufficient clearance with the inner walls of the dome chamber that fluid can flow past the piston. It will be maintained in its upward position by spring 83.

When the stabilizer is immersed in liquid at the time the charge chamber pressure is increased, liquid will flow into the dome chamber. It is undesirable that liquid contact the charging valves. To avoid this a partition 86 is provided between the dome chamber and the dome pressure control assembly and extending from this is a tube 87. Since this tube extends to the upper part of the dome chamber, any liquid flowing through ports 85 will accumulate in the bottom of the dome chamber leaving the dome pressure control assembly out of contact with liquid until the dome chamber has been substantially filled therewith.

Reference is made to copending application Serial No. 484,164, filed January 26, 1955, for further details of the stabilizer.

In discussing the operation of the system using the stabilizer, let it be assumed that the stabilizer has been landed in mandrel 18 of FIG. 1B. Then upon opening valve 90 in tubing 11, the tubing pressure will drop so that the well fluid from formation 91 can flow through perforations 61. At this time, the stabilizer has its valve element 63 seated preventing flow into the macaroni string. While this is happening, gas can be withdrawn through tubing 11 so that there is effected a separation of gas and oil while the production is still in the well. When the desired head of liquid has accumulated above the stabilizer, valve 90 can be closed and this permits the formation pressure to build up sufficiently to open a stabilizer valve. When this has occured, the formation pressure is free to pressure the oil up through the macaroni tubing to the surface of the well. When a predetermined quantity of oil has been discharged, valve 90 can be opened again, which will reduce the tubing pressure to again close the stabilizer valve. The cycle will then be repeated. Of course, in such operations, the stabilizer is located at a level such that the formation pressure can force oil to rise to a desired head thereabove.

Valve 90 can be placed on automatic control if desired. For example, a time cycle controller 92 can be connected to valve 90 to open and close it at timed intervals. By properly adjusting these intervals, a desired head of oil can be accumulated above the stabilizer before the valve 90 is closed to start flow from the well. Also, it can be set to close when the desired head of liquid has been discharged into the macaroni tubing. If desired, the valve can be made to close responsive to gas arriving at the surface of the well through the macaroni tubing. Of course, the pressure in the charge dome of the stabilizer valve should be such that the stabilizer is open when valve 90 is closed and closed upon predetermined opening of valve 90. Such pressure can be easily adjusted for different well conditions simply by raising and lowering the pressure in tubing 11 to open and close the dome pressure charging assembly as above described.

Another type of operation is also possible in many different wells. In such operation, the stabilizer is constructed so that it will open and close responsive to changes in head of liquid above the stabilizer. The illustrated valve can be converted to this type of operation by plugging the illustrated inlet to passage 60 and connecting this passage to 62. Passage 61 is then eliminated and a port provided between the exterior of the valve and chamber 70. Then when pressure acting through port 65 opens the valve, the tubing pressure in chamber 70 becomes effective to apply an increased force to hold the valve open. As a result, the closing pressure of the valve will be substantially lower than the opening pressure. With such an arrangement, well fluids can be passed into tubing 11 to accumulate a head above the stabilizer. When this head is high enough, the resulting pressure opens the stabilizer valve. At that time liquid will be above the stabilizer valve and it will be pressured into the macaroni string. As soon as the height of liquid in the tubing has fallen a desired amount, the stabilizer valve will close. In this manner, the well can be produced so that a predetermined slug of oil is always passed into the macaroni string each time the stabilizer valve operates. In this type of operation, gas can likewise be withdrawn through valve 90 and in this case the withdrawal can be continuous if desired. Of course, the pressure charge of the stabilizer can be adjusted as above described so that it will cause the stabilizer to close just before the head of oil has been discharged into the macaroni string. If desired, the pressure can be set slightly less so a slug of gas will be injected into the macaroni string to clear it of oil.

When it is desired, a gas lift valve working valve can be landed in the upper mandrels, a lower mandrel having a stabilizer therein. Then the working valve can be used to inject lifting gas into the macaroni string by setting its dome pressure so that it will open at a pressure which will also open the stabilizer to the macaroni string.

Of course, the ports on the stabilizer can be reversed so that the production of oil is through tubing 11 rather than the macaroni string.

Plural Zone Testing

Figures 4A, 4B:
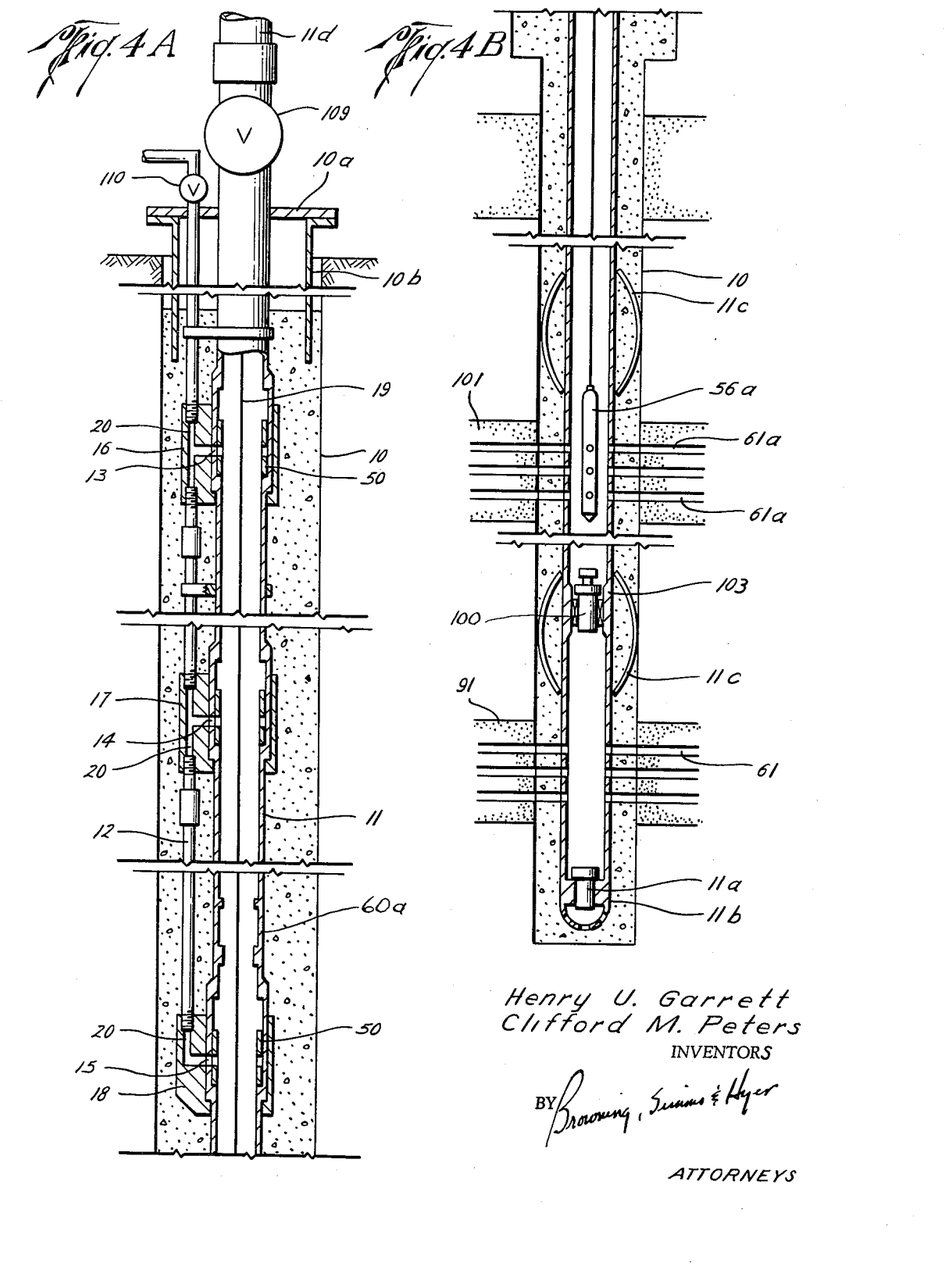
FIGS. 4A and 4B illustrate schematically another embodiment of the well apparatus of this invention and illustrates the method and apparatus by which different formations can be tested.

Referring now to FIGS. 4A and 4B, there is shown an apparatus by which a plurality of zones can be tested. Thus, the string of tubings or conduits is cemented in place as described above. In FIG. 4A, the cement is shown as extending up into surface casing 10b. After the cement has set, perforating gun 56a or the equivalent can be lowered into the oil string until it is opposite formation 91. The gun can then be fired to make perforations 61 extending through the cement into this formation after which the formation is tested. If desired an upper formation can thereafter be tested simply by setting wireline plug 100 above perforations 61 but below the upper formation. This plug effectively seals tubing 11 to prevent flow upwardly therethrough from formation 91. Then gun 56a can again be lowered into the well until opposite an upper formation 101 and fired to form perforations 61 therein. This formation can then be tested. Successive zones up the hole can then be treated in the same manner. With this method of operation, it is only necessary to set a wireline plug between each zone as the testing proceeds upwardly. It is not necessary to squeeze cement the perforations of one zone before another zone is tested. This means that after the various zones have been tested and it is desired to produce from tested zones, it is not necessary to again reperforate at the zones which it is desired to produce. If an intermediate zone has been tested and it is not desired to produce the same, cement can be passed down through the tubing and squeezed into the perforations to this zone or in some cases it can be blanked off by suitable use of conduits.

While it is preferred to use the wireline plug type of operation, squeeze cementing in the well-known manner can be used to shut off a zone after it has been perforated and before perforating and testing another zone. However, this has the disadvantage of requiring reperforation of the squeeze cemented zone if it is desired to produce the same.

Figures 5A, 5B:
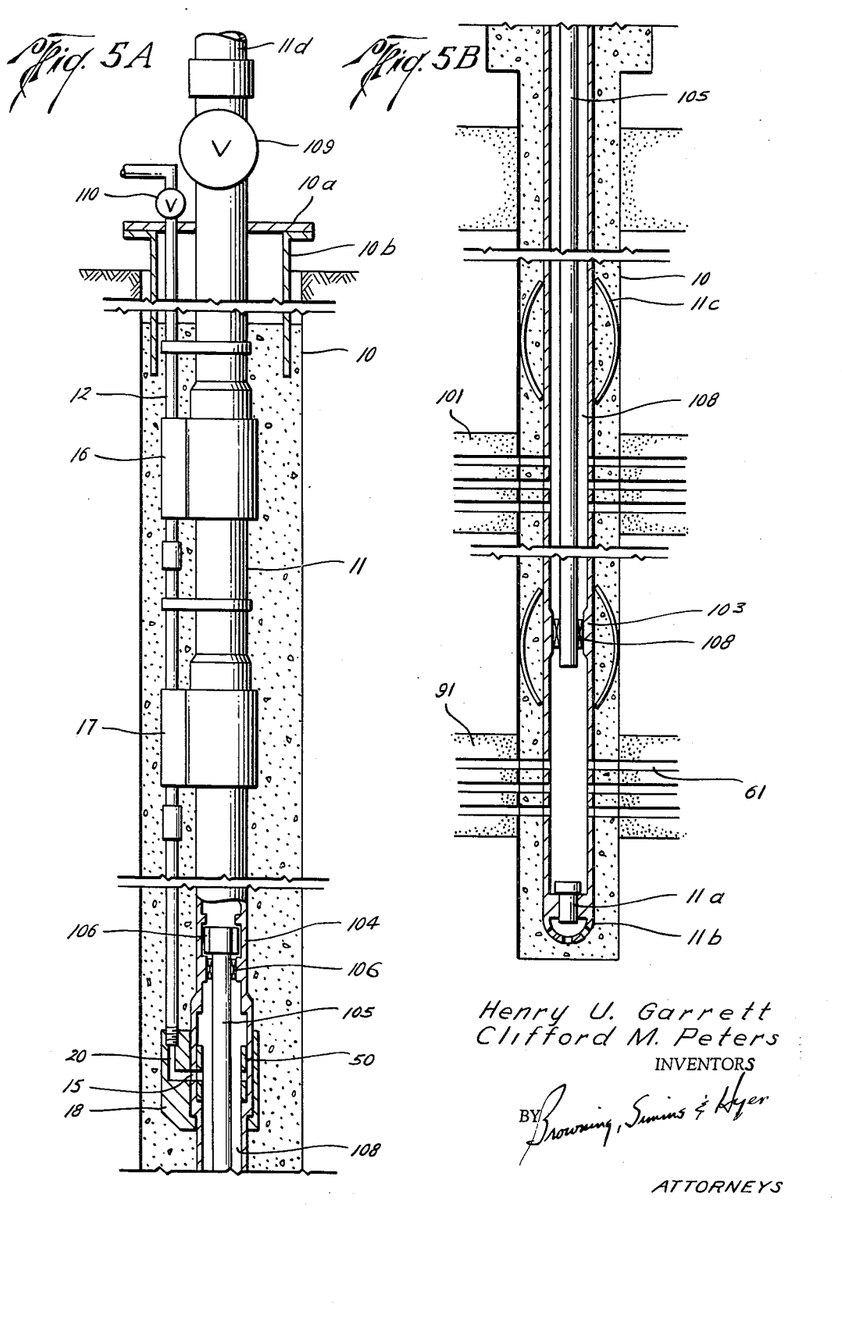
FIGS. 5A and 5B illustrate schematically one embodiment of this invention by which a well can be dually completed and produced.

Dual Zone Completion

Where two zones are to be individually tested and produced, the lowermost is perforated first, treated if necessary, and tested as above described. A wireline plug is then run and set just above first perforation. The upper zone is then perforated, etc. in the same manner. A suitable flow directing means is then run in through the oil string, after the wireline plug has been removed, so that fluids from the two zones are separately conducted to the oil string and to the macaroni tubing for separate flow to the earth's surface. One form of such flow directing means is shown in FIGS. 5A and 5B. In these figures, formations 91 and 101 are shown as having been readied for production. The oil string, as it was run into the bore hole, has been equipped with a pack-off mandrel 103 at a level intermediate formations 91 and 101. It is also equipped with a landing nipple 104 situated above the mandrel through which production will flow into the macaroni string. Then after the two formations have been readied for production, extension pipe or conduit 105 is lowered by wireline through the oil string and it carries a latching and sealing mechanism 106 adapted to latch the extension pipe in landing nipple 104 and seal it to the oil string. The lower end of the extension pipe carries a seal 108 which cooperates with pack-off mandrel 103 to seal the lower end of the extension pipe to the oil string. Of course, before the extension pipe is landed, sleeve 50 of mandrel 18 has been moved to open position.

With the installation as thus described, production from the lower formation 91 flows upwardly through extension pipe 105 into the oil string and thence to the surface of the earth. Production from upper formation 101 flows upwardly in the annulus between the oil string and the extension pipe and thence through passageway 15 into the macaroni string to the surface of the earth. Master valves 109 and 110 on the tubings can be used to control flow from the formations.

Suitable cross-over apparatus can likewise be landed in the oil string so that flow from formation 91 is through the macaroni string and flow from formation 101 is through the oil string. For example, the lower end of the extension pipe can be closed and in addition, a seal provided between the pipe and the oil string intermediate passageway 15 and the upper formation, a by-pass provided from above such seal to below seal 108 and the extension pipe formed with openings between these two seals. The flow from the lower formation is through the by-pass to passageway 15 and the macaroni string while flow from the upper formation is through the extension pipe openings and thence upwardly into the oil string. Other modifications are possible also.

Triple Zone Completion

Figures 6A, 6B:
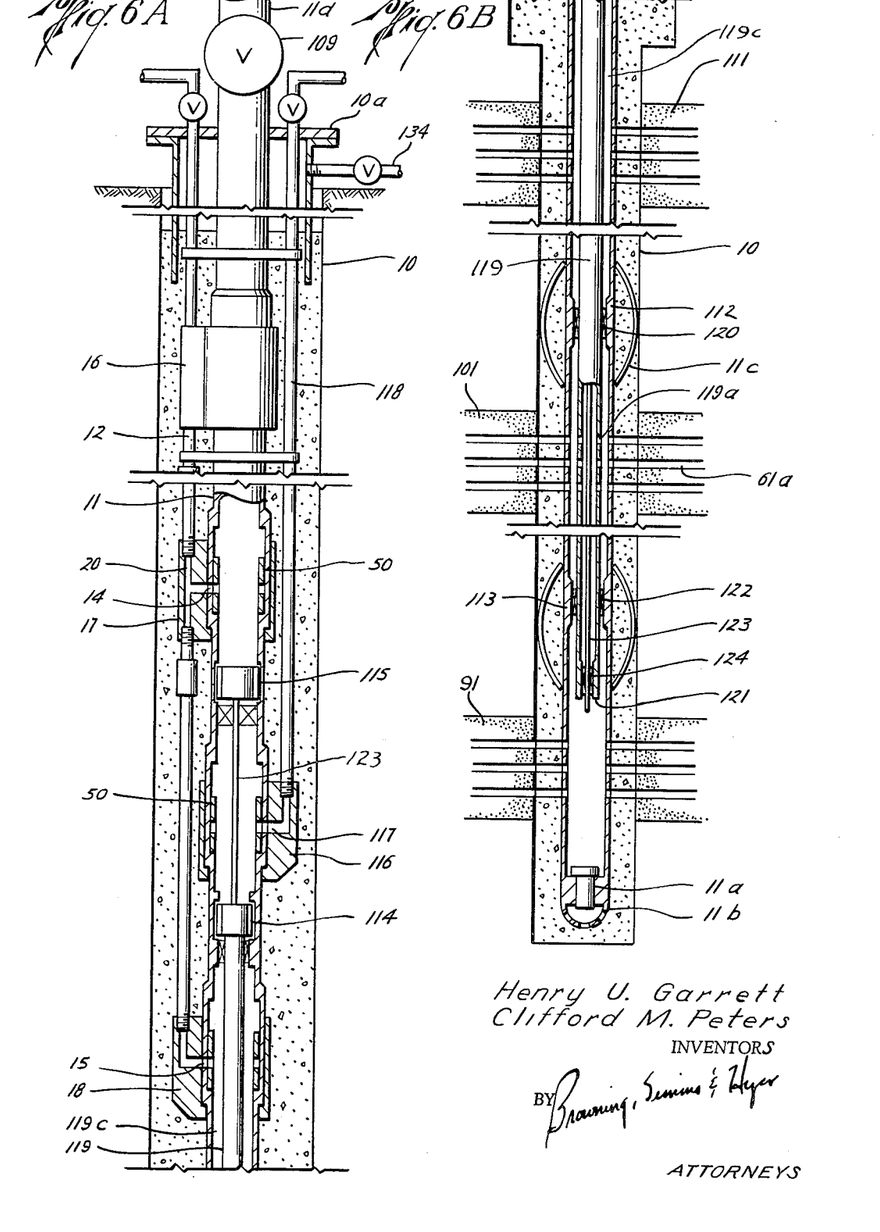
FIGS. 6A and 6B are similar to FIGS. 5A and 5B except they illustrate a triple completion.

Triple-zone completion is also possible with the method and apparatus of this invention. One embodiment of a triple zone completion is shown in FIGS. 6A and 6B wherein oil string 11 is shown cemented through three production zones, 91, 101 and 111. As before, each zone, from the bottom upwards, is perforated, treated and tested and then a plug is set before going on to the next zone. The oil string, before cementing in place, has been provided with two pack-off mandrels, 112 and 113 which are respectively between the upper and intermediate zones and the intermediate and lower zones. The internal diameter of these pack-off mandrels is slightly less than that of the extension pipe landing nipples and of the mandrel sleeves. In this connection, the oil string has also previously been fitted with extension pipe landing nipples 114 and 115 and with an additional mandrel 116 having a passageway 117 therein communicating with a second tubing such as macaroni tubing 118. Mandrel 116 is similarly equipped with a sleeve 50 controlling flow through passageway 117. Landing nipple 114 is situated in the oil string intermediate passageways 15 and 117 in mandrels 18 and 116, while the other landing nipple 115 is situated above mandrel 116. With this arrangement, an outer conduit or extension pipe 119 can be landed and latched in landing nipple 114 and is fitted with a suitable seal to form a seal between itself adjacent its upper end and the oil string. It also carries a seal 120 which, with the outer extension pipe landed, forms a seal with upper pack-off mandrel 112. It also carries an internal pack-off mandrel 121 for purpose to be described and an outer seal 122 which seals with lower pack-off mandrel 113. An inner extension conduit or pipe 123 is then landed and latched in the upper landing nipple 115 and also forms a suitable seal between itself and the oil string adjacent its upper end and above passageway 117. It carries a seal 124 which cooperates with the pack-off mandrel 121 in the outer extension pipe to form a seal therewith. With such arrangement, it will be noted that the combination of pack-off mandrels 113 and 121 and seals 122 and 124 effectively form a seal between the inner extension pipe and the oil string. As shown the outer extension pipe has openings 119a therein through which production from the intermediate formation flows. If a full-bore opening through pack-off mandrel 113 is not required, the outer extension pipe can terminate above this mandrel thereby eliminating the need for the openings 119a therein. Then mandrel 113 would have an internal opening small enough to cooperate with the seal on the lower end of the inner extension pipe. However, with the illustrated arrangement, the bore of mandrel 113 can be made only slightly smaller in diameter than the bore of the tubing, sleeves, etc. above so as to facilitate wireline operations through the lower mandrel 113.

For this particular arrangement, it will be seen that flow from formation 91 will be upwardly through inner extension pipe 123 and thence through the oil string to the surface. Flow from intermediate formation 101 will be through perforations 119a in the outer extension pipe and thence up through the annulus to passageway 117 and to the surface through macaroni string 118. Flow from upper producing formation 111 will be through annulus 119c to passageway 15 and thence through macaroni string 12 to the surface. Thus, there has been provided a method and apparatus for permitting a triple zone completion of a well and the zones are isolated from each other and produce independently of each other.

Of course, it is contemplated that a variety of changes may be made in the arrangement of equipment for multiple zone completion (dual, triple, etc.), particularly arrangements whereby flow from one formation is produced through another tubing string than that illustrated. For example, it is possible to bring production from a weak formation, such as an upper one, into the oil string through which it can be gas-lifted to the surface by originally installing an additional macaroni string equipped with suitable mandrels connecting it with the oil string. Such additional macaroni string and mandrels can take the form illustrated and described with respect to FIGS. 1A and 1B whereby gas lift valves, if desired, can be landed in the mandrels to control lifting gas flow from the additional macaroni string into the oil string. Further production can be had through the additional macaroni string into which lifting gas is injected from the oil string. As another alternative, lifting gas can be injected from one macaroni string into another by using mandrels such as those shown in copending application Serial No. 435,984, filed June 11, 1954. Of course these mandrels will be equipped with a lug for an additional macaroni string so that flow will be from one macaroni string to another. Also, a wireline gas lift valve can be landed in this mandrel to control flow of lifting gas. Further, gas lift valves need not be used in any type of mandrel and gas can be flowed continuously through the mandrel passageway (e.g. 15) simply by leaving one of sleeves 50 in open position. The above applies to all of the embodiments of this invention.

*Completion Inside Existing Casing*

As indicated above, a well which had been previously cased can be completed in accordance with this invention. Such type of completion will usually be practiced when the casing has become defective, particularly at its lower end. However, the completion is possible whether or not the casing is so defective. Further, the completion can be made in cooperation with surface casing, with or without intermediatoe casing, to permit a very satisfactory completion of high pressure wells. Also, such a type of completion permits the annulus between the surface casing and the tubing string to be used as a gas volume surge chamber if the well is to be placed on an intermittent gas lift flow.

Figures 7A, 7B:
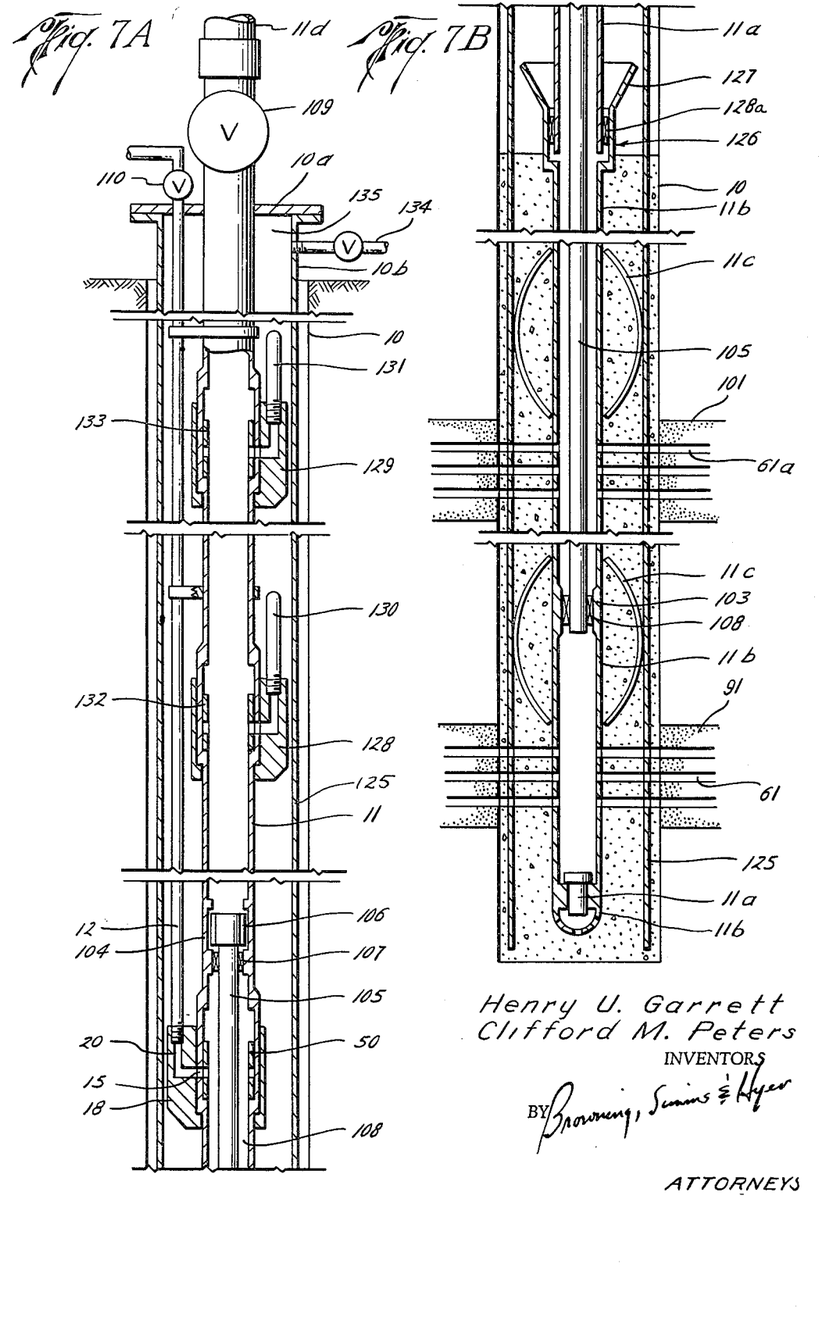
FIGS. 7A and 7B illustrate still another embodiment particularly useful for completing partially or fully cased wells or wells in which hte lower portion of the casing is defective and also illustrates a dual completion with gas lift.

Such an arrangement is illustrated in FIGS. 7A and 7B. Thus a casing 125 has previously been set in conventional manner. Since the permanent completion installation of this invention is illustrated in these figures as being for a dual completion, the oil string and macaroni have been equipped as described for FIGS. 5A and 5B and hence further description of their common features is not required. Again, the oil string has been cemented upwardly into existing casing 125 to a level above the upper producing formation 101. It is provided with a detachable tubing coupling 126. This coupling is here illustrated as comprising an upwardly flared receiver 127 attached to the lower portion 11b of the oil string and sealed to the upper portion 11a of the oil string by a suitable seal 128a. A releasable latch can be provided between upper and lower tubing string portions to facilitate placement of the lower portion before cementing.

The upper portion 11a of the oil string is shown the type disclosed in copending application Serial No. 330,294, filed January 8, 1953, which includes sleeves 132 and 133 in series with the gas lift valves. These sleeves are moved between open and closed positions by equipped with gas lift mandrels 128 and 129 carrying gas lift valves 130 and 131. These mandrels can be of a suitable wireline tool so as to independently and selectively permit and interrupt flow communication between the gas lift valves and the oil string.

With this arrangement, upper oil string portion 11a can be pulled from the well at any time by simply disconnecting it from the detachable tubing coupling 126. This permits any alteration of this upper oil string portion such as changing the setting on the gas lift valve, adding additional valves etc. Lifting gas can be admitted via inlet 134 to the casing annulus 135 so as to permit the gas lift valves 130 and 131 to function to gas lift oil up the oil string.

In extremely high pressure completions, a single zone can be perforated and the extension pipe assembly omitted. Then the macaroni string can be used as a kill line in case of trouble. For multiple zone completions, the macaroni string used as the kill line can be connected with a plurality of mandrels so that it communicates with each of the flow passages from the various zones and in this manner can be used to kill each zone.

*Upper Zone*

It is usually desirable that the oil string extend through all of the zones to be completed and that the lower end of the macaroni tubing or equivalent be connected thereto at a point above the uppermost zone. The reason for this is that it facilitates shooting or perforating since the perforating can be in any direction without endangering the macaroni strings. As pointed out above, it is possible to orient the perforator so that it will perforate only over a sector not occupied by a macaroni string and in this case the macaroni strings can extend into or past one or more formations.

Figures 8A, 8B:
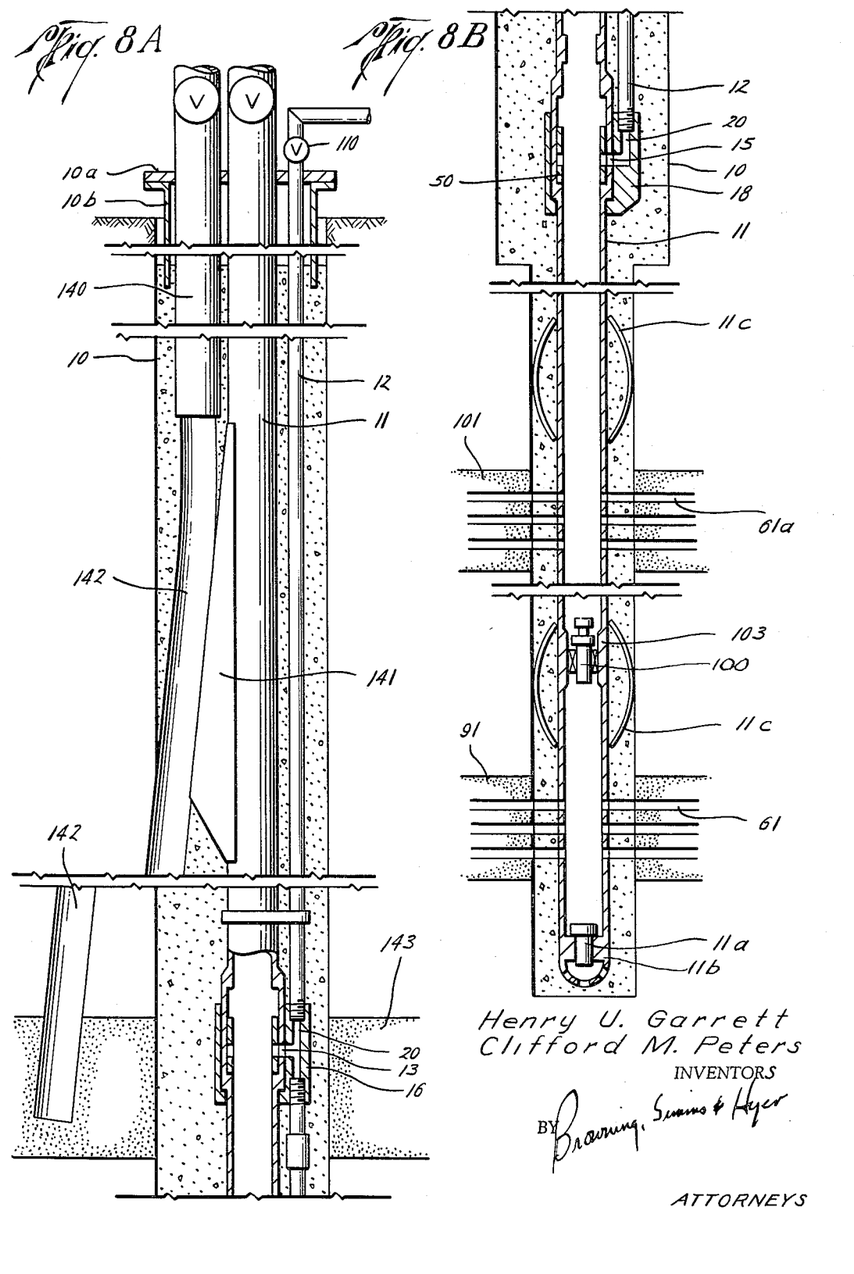
FIGS. 8A and 8B illustrate still another embodiment useful for producing a zone or a well after the tubings have been cemented therein.

However, to permit a formation to be produced where the formation, such as a shallow one, lies above the lower end of the macaroni strings and without having to orient the perforations, an apparatus and method are provided for bringing in the upper formation after the tubing strings have been cemented in place. One embodiment of this aspect of the invention is illustrated in FIGS. 8A and 8B. In this embodiment, the main oil string has been cemented in place arong with an additional tubing 140 which terminates adjacently above the point where the upper formation is to be produced. The main oil string is then provided with a deflector or whipstock 141 situated adjacently below and aligned with the lower end of tubing 140. Then a suitable drilling mechanism, such as one having a bit connected to a flexible drill stem, is run down through a tubing 140. It is used to drill through the cement in the bore hole and is deflected laterally outwardly at an angle by deflecting plate 141 so that hole 142 drilled thereby can be terminated in formation 143. In this manner, the upper formation is completed and is produced through tubing 140.

This method of completion is applicable even though other zones therebelow are not to be produced and is a new method of completion. In this sense, the deflector plate can be carried by other than another string of tubing and can be connected to tubing 140 if desired. Further, as far as the method is concerned, any suitable mechanism can be employed by which a hole is made to extend through the cement in the bore hole and laterally into formation 143.

*Acidizing Procedure*

The various embodiments of this invention readily permit acidizing any particular formation. Thus, after perforation, the lowermost sleeve in the lowermost mandrel 18 is placed in open position and the master valve on the macaroni string is closed. The acid is then pumped down through oil string 11. If it is desirable not to pump too much fluid back into the formation, fluid in the oil string, displaced by the acid, can be produced through the macaroni string by opening its master valve. Of course, the macaroni string master valve may be closed in ample time to prevent the acid from flowing into the macaroni string. Thereafter, the acid is pumped out into the formation and spent acid can be brought out by production flowing through the oil string. If additional velocity is needed to bring out the spent acid, production can also be routed through the macaroni simply by opening the macaroni master valve and closing the oil string master valve. Alternatively, the acid can be pumped down through the macaroni string so that the above described operation is reversed. Of course plugs are set between formations as above described before the perforation.

Fracturing

Any of the formations can be fractured in essentially the same manner as described for acidizing except that the frac-mix is substituted for the acid. However, in this instance, it should be noted that a pressure gauge can be placed on the macaroni string at the surface and this pressure reading plus the hydrostatic head pressure of the liquid in the macaroni string is the actual pressure on the sand face. This pressure will usually be higher than that at the pump or at the upper end of the oil string due to the friction loss of the frac-mix flowing down the oil string. Thus, a very accurate measure of the pressure on the sand face can be obtained.

Since the bottom sleeve is open, the frac-mix can be reversed out at anytime, if necessary, by pumping oil or other fluid down the macaroni and flowing it up through the oil string.

As with acidizing, the procedure can be reversed by pumping the frac-mix down the macaroni string and using the oil string for reversing out.

Special Applications

Corrosion inhibiting chemicals can be injected directly down the macaroni string to be injected into the oil string at any selected one of the mandrels located therein. Also, the well can be placed on pump simply by running in a pump on a sucker rod string and landing it in a previously installed pump seating nipple or setting the pump on a pump anchor or in the permanent completion landing nipple. Again the bottom sleeve should be opened and the pump placed above the sleeve. Hydraulic pumping can be accomplished by running the pump receiver assembly on the oil string before it is cemented in place and connecting it to the macaroni string. A sleeve can be used to control flow through this connection, in a manner similar to that discussed above, to keep the macaroni string closed while cementing takes place. The pump and standing valve can then be flowed or otherwise landed in the pump receiver assembly, or removed by flowing it out by pumping down the macaroni string. In such an installation, the power oil is pumped down the tubing and the macaroni string connected to it serves as the production string.

The tubing string portions including any mandrels which are cemented in the hole can be made of a drillable metal so that, if necessary, the cement and strings therein can be drilled out.

While frequent reference has been made herein to macaroni tubing, the tubing strings, or any number thereof, all can be of conventional or other desired size as long as one of them permits wireline operations to be carried on therein. In this connection, as the depth of the completion increases, the size of the macaroni string should be increased to obtain greater mechanical strength and, more important, to minimize pressure drop in reverse circulating, gas-lifting, etc. For deep holes, both strings can be telescoped.

This is a continuation-in-part application of an earlier filed application, Serial No. 599,592, filed July 23, 1956 (now abandoned).

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for pumping fluid from a well comprising a string of parallel conduits extending into a well bore, a plurality of means interconnecting said conduits at vertically spaced intervals and each including a flow passageway from one conduit to another, receiving means in one of said conduits adjacent said passageways, gas lift valves releasably latched in said receiving means and having parts engageable with a wireline tool for landing and removing the gas lift valves from said receiving means, said gas lift valves controlling flow through said passageways responsive to pressure in one of said conduits, cement filling the annulus around said string to a level above a producing formation and cementing at least the portion of the string downwardly of said level permanently in the well bore, and well fluid inlet means in at least one and in less than all of said conduits and extending through the cement around the same and communicating with a producing formation.

2. An apparatus for completing and producing a well which comprises a string of parallel conduits extending into a well bore, a plurality of means connecting said conduits at vertically spaced intervals and each including a flow passageway from one conduit to another, receiving means in at least one of said conduits adjacent each of said passageways and having a construction adapted to receive a wireline manipulatable tool, cement filling the well bore exteriorly of said string to a level above a producing formation, and a well fluid inlet in one or more and in less than all of said tubing communicating through the cement with the producing formation.

3. The apparatus of claim 2 in combination with gas lift valves landed and releasably latched in said receiving means, said valves each having a part engageable with a wireline tool for landing and removing the same from said receiving means said valves and receiving means being constructed to constrain flow through the passageways to be through the gas lift valves.

4. An apparatus for completing and producing a well comprising flow means including a string of two or more parallel conduits extending into an uncased well bore, a plurality of vertically spaced mandrels, each of which is common to two of said conduits, a port in each of said mandrels connecting between said two conduits, a wireline manipulatable valve in each of said mandrels which valve controls flow through a port, cement filling the well bore exteriorly of the string to a level above a producing formation and forming a seal between the string and the wall of said well bore below said level and extending vertically across said producing formation, and well fluid inlet means extending through said cement from said formation and into at least one and into less than all of said conduits.

5. An apparatus for completing and producing a well which comprises a string of parallel conduits extending into a well bore, a plurality of vertically spaced-apart mandrels each of which is connected to at least two of the conduits to be a part thereof, a port in each mandrel communicating when open between the interior of one conduit connected therewith and the interior of the other conduit connected therewith, valve means for selectively opening and closing said ports, said valve means being manipulatable by a wireline tool to so open and close said ports, cement filling the well bore to a level above a producing formation and forming a seal extending vertically across said formation and transversely between all of the conduits which extend to such formation and the well bore wall, and perforations through at least one and less than all of said conduits and through the cement for admitting fluid from said formation into at least one of said conduits.

6. A method of completing and producing a well after its bore hole has been drilled through a producing formation which comprises running a string of first and second parallel conduits into the bore hole with the first conduit extending to a point below the upper level of the producing formation, flowing cement down said first conduit and thence along the exterior thereof until the bore hole is filled to an upper level above the said producing formation, then forming a perforation in said first conduit and the cement surrounding the same to provide fluid communication between said first conduit and said formation, producing fluid from said formation by flowing such fluid through said perforation into said first conduit and thence out of the well through one of the first and second conduits and, during the course of such production, establishing fluid communication between the first and second conduits at a level above said formation and flowing fluid into the well via the other of said first and second conduits and said communication and lifting the produced fluid from the well.

7. A method of completing a well after its bore hole has been drilled through an upper and a lower formation which comprises establishing two or more selectively intercommunicable parallel flow paths in the bore hole with at least one flow path extending to a point opposite said lower formation by running a string of two or more parallel conduits into the bore hole with one conduit extending to a point below the upper level of the lower formation, flowing cement down through said one conduit and thence along the exterior thereof until the space between said one conduit and the bore hole wall is filled to an upper level above said upper formation, forming a first perforation in said one conduit and the cement surrounding the same at the level of the lower formation to provide fluid communication between said one conduit and the lower formation, setting a plug in said one conduit intermediate said first perforation and said upper formation, and forming a second perforation in said one conduit and the cement surrounding the same at the level of the upper formation.

8. A method of completing a well having its bore hole extending through a plurality of potential producing formations which comprises running a string of two or more side-by-side conduits into the bore hole with at least one conduit extending past an upper into a lower one of said formations, cementing said one conduit in the bore hole so that the cement extends across the faces of said formations, forming a perforation in said one conduit and the cement around the same at the level of the lower formation, preventing fluid flow through the conduit at a point above said perforation but below the upper level of said upper formation while at the same time maintaining fluid communication between the lower formation and conduit via said perforation, and then forming another perforation in said conduit and the cement around the same above said point and at the level of said upper formation.

9. A method of completing and producing a well having its bore hole extending through a plurality of potential producing formations which comprises running a string of two conduits into the borehole with one conduit extending past an upper into a lower one of said formations, cementing said one conduit in the bore hole to a level above said upper formation, forming a perforation in said one conduit and the cement around the same at the level of the lower formation, producing said lower formation, thereafter preventing fluid flow through the conduit at a point above said perforation but below the upper level of said upper formation, then forming another perforation in said conduit and the cement around the same above said point and at the level of the upper formation, and producing fluid from at least one of said formations through one of said conduits while introducing fluid into the well via the other of said conduits.

10. A method of completing a well having its bore hole extending into a producing formation which comprises running a string of at least two parallel side-by-side conduits into the bore hole with at least a first conduit extending into said formation, cementing at least said first conduit in the bore hole to a level above said formation, forming a perforation in said first conduit and the cement around the same at the level of said formation, establishing fluid communication between said first conduit and the second conduit of said string at a level in the well adjacently above said perforation, pumping treating liquid down one of said first and second conduits while flowing fluid displaced by the treating liquid through said fluid communication and thence up the other of said first and second conduits, interrupting flow of displaced fluid from said other conduit and continuing to force said treating liquid down said one conduit and thence through the perforation into said formation.

11. A method of completing and producing a well having a bore hole extending into a formation which comprises running a string of at least two parallel conduits into the bore hole with at least a first conduit extending into said formation, cementing said string in the bore hole to a level above said formation, forming a perforation in said first conduit and the cement around the same to provide a flow passage between said formation and first conduit, selectively providing fluid communication between said first conduit and a second conduit of said string at vertically spaced levels in the well while flowing a first fluid down said second conduit into said first conduit via said fluid communication, and producing a second fluid from said formation via said perforation to the surface of the earth through said first conduit.

12. The method of claim 11 wherein said string is cemented along substantially its entire length in the bore hole.

13. An apparatus for completing a well having at least upper, intermediate and lower producing formations which comprises, a string of three or more parallel conduits extending from the earth's surface into the well with at least a first conduit extending into the lower formation, first and second vertically spaced passageways connecting the first conduit respectively with the second and third conduits, a valve disposed in the first conduit adjacent to each of said passageways and operatively associated with each passageway and manipulatable from the earth's surface to control flow through its respective passageway, cement filling the bore of the well exteriorly of said string to an upper level above the upper formation, perforations through the first conduit and the cement surrounding the same leading respectively to each of said formations, first and second flow pipes positioned in the first conduit and respectively sealed to the first tubing above both of said passageways and intermediate said passageways, and means sealing the first pipe to the first conduit between said lower and intermediate formations and the second pipe to the first conduit between said upper and intermediate formations, said first and second pipes having an opening respectively for receiving fluid from said lower and said intermediate formations.

14. A method of completing a well having upper and lower formations which comprises running a string of at least two parallel conduits into the bore hole of the well with a first conduit extending into the lower formation and a second conduit to a point adjacently above the point where the upper formation is to be produced, filling the bore hole with cement to a level above the upper formation, perforating the first conduit and cementing around the same at the level of the lower formation, and drilling down through the second tubing and laterally outwardly thereof into the upper formation.

15. An apparatus for completing a well having a producing formation which comprises a string of two parallel tubings in the well with one tubing terminating adjacent said formation and the other extending to a lower level, cement filling the bore hole from an upper level above the lower end of said one tubing to a lower level below said formation, deflecting means carried by said other tubing below said one tubing and positioned to deflect a drill mechanism operating through the one tubing outwardly through the cement and into said formation.

16. An apparatus for completing a plural production zone well which comprises a string of two or more parallel conduits extending into the uncased bore hole of the well with at least a first conduit extending into a lower formation and a second conduit extending to a point adjacent to an upper formation; a mandrel interconnecting said first and second conduits above the upper formation, said mandrel having a passageway for fluid therethrough communicating with said first and second conduits; a valve in one of said conduits responsive to manipulation at the earth's surface, controlling flow through said passageway; cement filling the bore hole exterior of said string to a level above said upper formation; upper and lower perforations through the first conduit and the cement around the same at the level of the upper and lower formations to conduct fluid from the respective formations into said first conduit; and means in said first conduit for providing separate flow paths from said upper and lower perforations, one of said flow paths leading from one of said perforations through said passageway and the second conduit to the earth's surface and the other flow path leading from the other perforation through the first conduit to the earth's surface.

17. The apparatus of claim 16 wherein said means providing flow paths includes a pipe positioned in the first conduit and having an upper terminus above said passageway and extending downwardly past said passageway and providing an opening to receive flow from one of said formations, means sealing between the pipe and first conduit above said passageway, means confining flow from the perforation associated with said one formation to be into said pipe opening, the pipe being closed to flow from the other formation which flow passes into the first conduit and upwardly therethrough and thence into said passageway to the second conduit.

18. The apparatus of claim 17 wherein said pipe is releasably retained in its position in the first conduit and is movable into and out of such position by wireline operation.

19. The apparatus of claim 16 wherein the first conduit passes through a formation intermediate said upper and lower formations, a perforation through the first conduit and the cement around the same leading to said intermediate formation, said string including a third conduit, a second passageway communicating between third and first conduits at a level vertically spaced from the first mentioned passageway, a second valve manipulatable from the earth's surface to control flow through the second passageway, said flow path providing means also providing a separate third flow path from the perforation leading to the intermediate formation to the second passageway for conducting flow from the intermediate formation to said third conduit.

20. An apparatus for completing a well having at least upper, intermediate and lower producing formations which comprises a string of three or more parallel conduits extending into one well from the earth's surface with at least the first conduit extending into the lower formation; first and second vertically spaced members connecting the first conduit respectively with said second and third conduits, said members having passageways therethrough communicating the first conduit and with the second and third conduits respectively; a valve manipulatable from the earth's surface disposed at each of said passageways to control flow therethrough; cement filling the bore of the well exterior of said string to an upper level above said upper formation; vertically spaced perforations through the first conduit and the cement surrounding the same leading respectively to each of said formations; and flow directing means in said first conduit providing separate paths of flow respectively from said vertically spaced perforations through said first passageway, through said second passageway and through said first conduit above both of said first and second passageways.

21. The apparatus of claim 20 wherein said flow directing means includes concentric pipes the inner of which is sealed to the first conduit above both of said passageways and extends to an opening communicating with the lower formation, the outer pipe being sealed to the first conduit intermediate said passageways and also at a level intermediate said upper and intermediate formations and having an opening thereinto providing fluid communication with said intermediate formation, and a seal around said inner pipe preventing flow from the lower to the intermediate formation.

References Cited in the file of this patent

UNITED STATES PATENTS

| | | |
|---|---|---|
| 1,334,638 | Tucker | Mar. 23, 1920 |
| 1,511,067 | Russell | Oct. 7, 1924 |
| 1,710,937 | McCarty | Apr. 30, 1929 |
| 2,357,145 | Standefer | Aug. 29, 1944 |
| 2,366,547 | Oak | Jan. 2, 1945 |
| 2,368,428 | Saureman | Jan. 30, 1945 |
| 2,605,637 | Rhoades | Aug. 5, 1952 |
| 2,652,000 | Woolsey | Sept. 15, 1953 |
| 2,749,989 | Huber | June 12, 1956 |
| 2,760,578 | Tausch | Aug. 28, 1956 |
| 2,767,792 | Spearow | Oct. 23, 1956 |
| 2,780,291 | Westling | Feb. 5, 1957 |
| 2,785,753 | Spearow | Mar. 19, 1957 |
| 2,808,781 | Garrett et al. | Oct. 8, 1957 |
| 2,839,142 | Huber | June 17, 1958 |
| 2,847,072 | Le Bourg | Aug. 12, 1958 |
| 2,858,107 | Colmerauer | Oct. 28, 1958 |
| 2,891,620 | Bielstein | June 23, 1959 |
| 2,939,533 | Coberly | June 7, 1960 |